Feb. 27, 1923. 1,446,806
H. H. MATHIS
MECHANICAL GEAR SHIFT
Filed Oct. 14, 1920 5 sheets-sheet 3
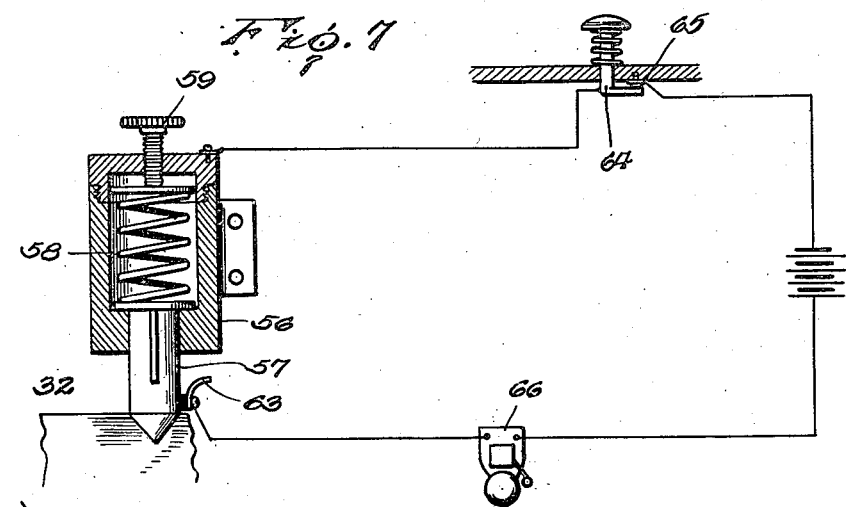
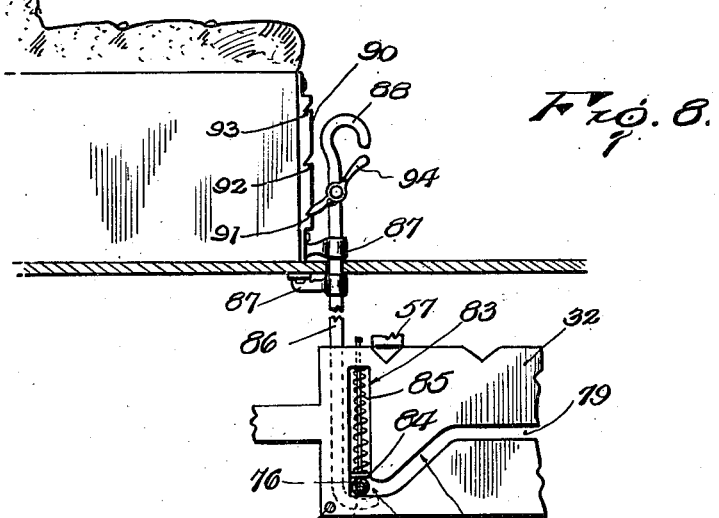
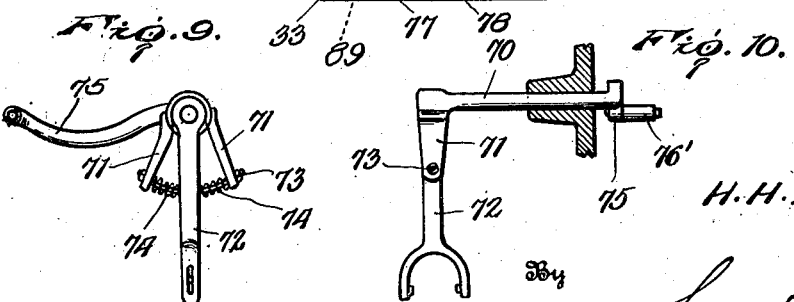
Inventor
H. H. Mathis
By
Lacey & Lacey, Attorneys

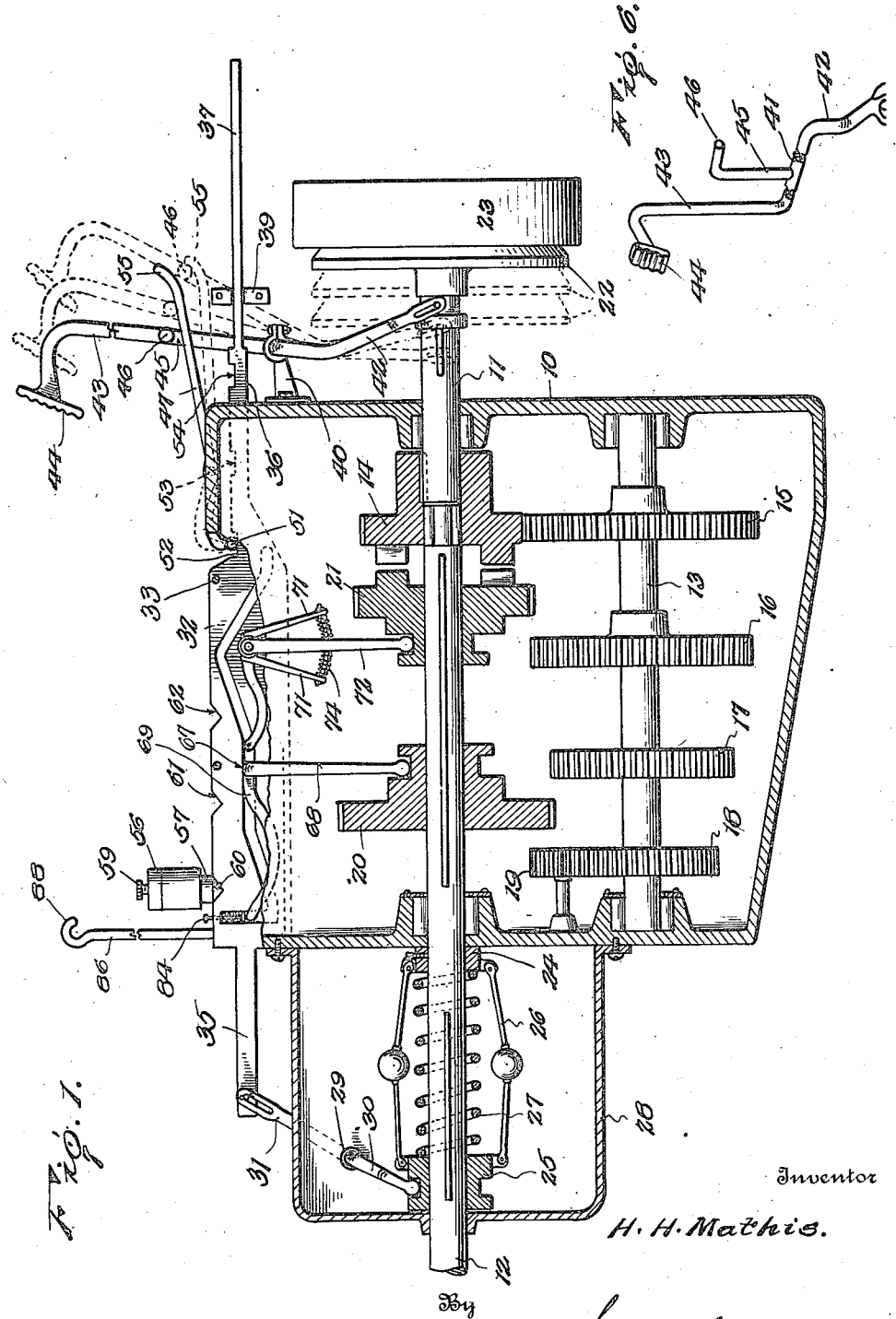

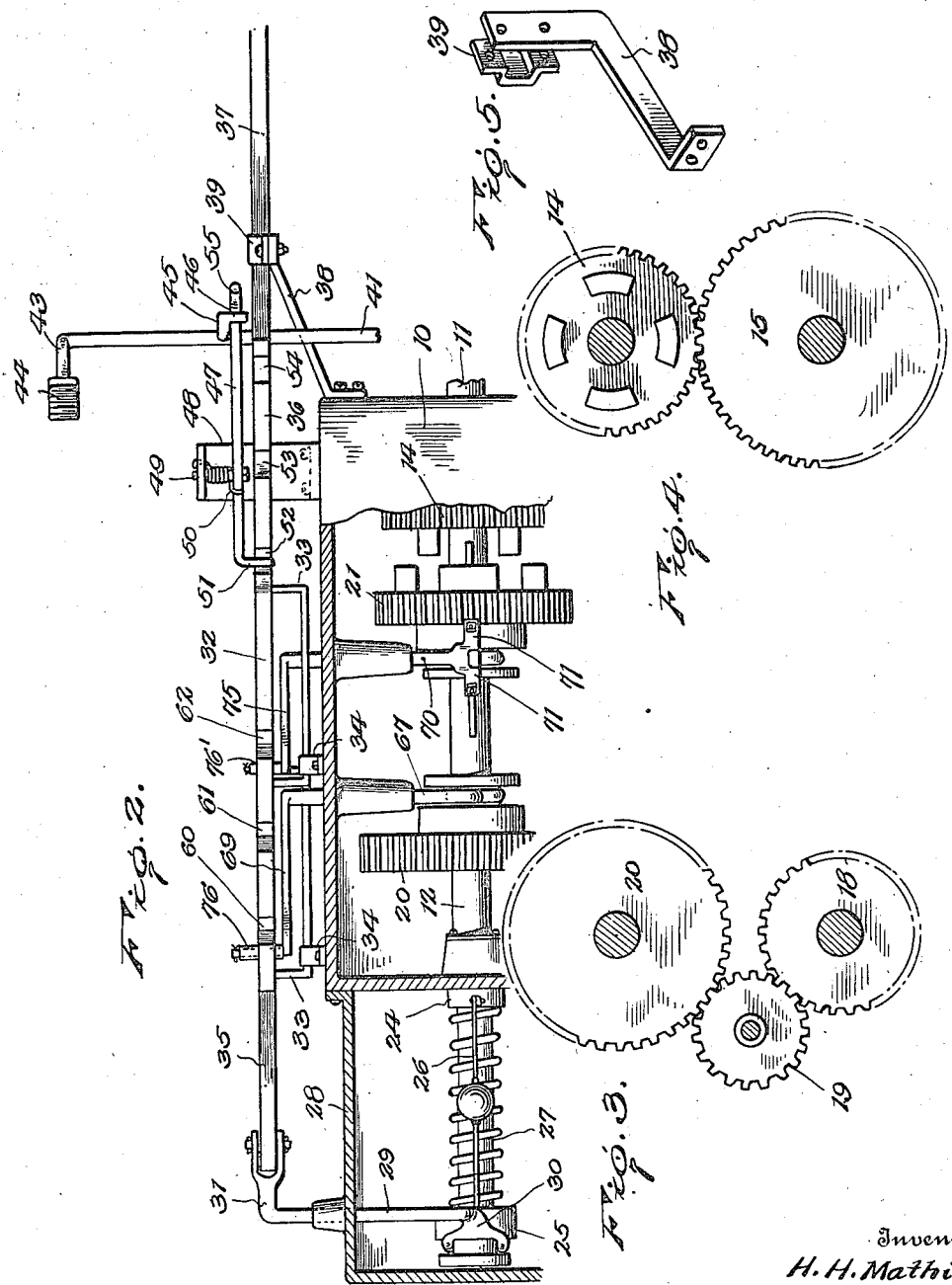

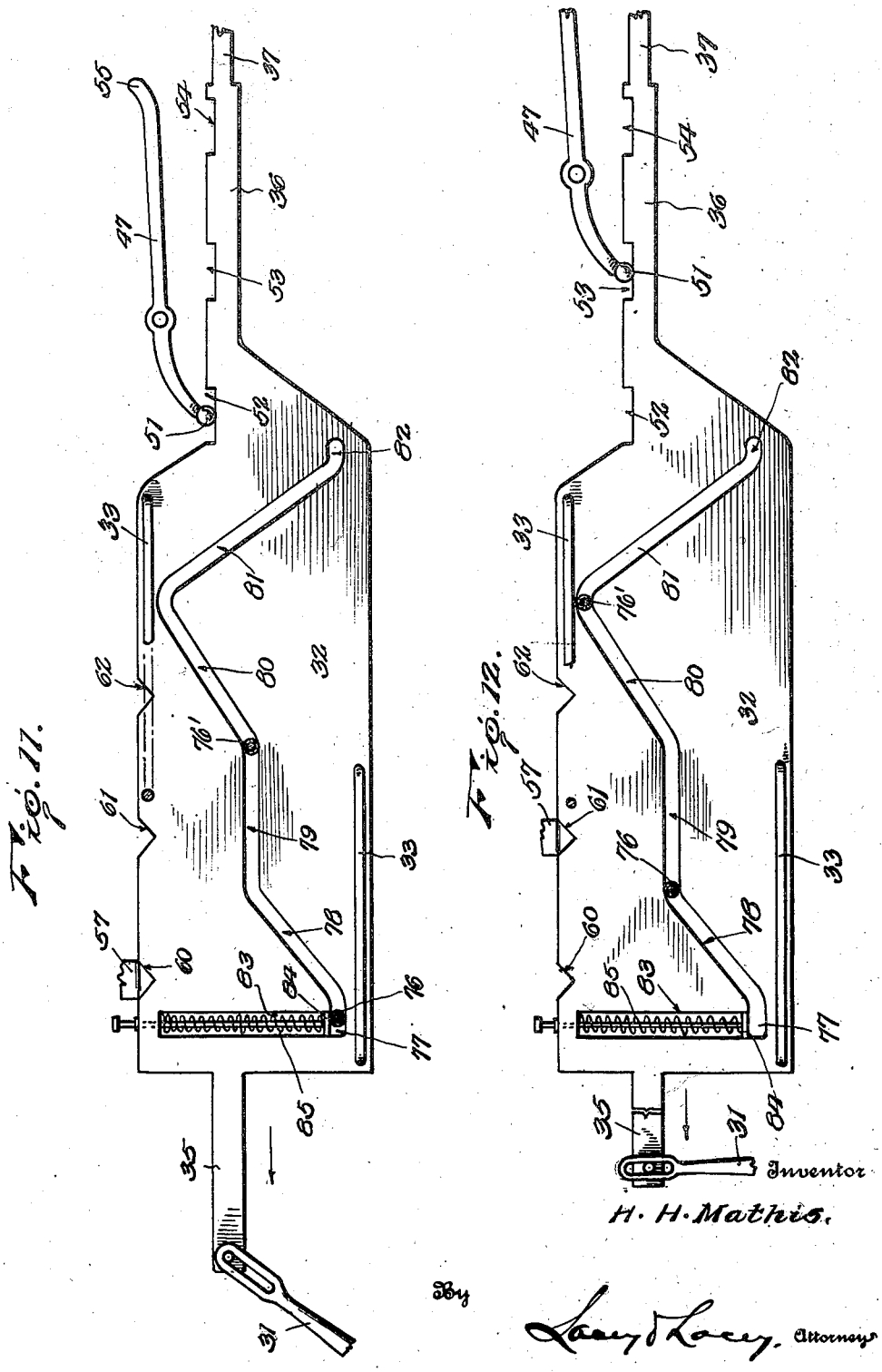

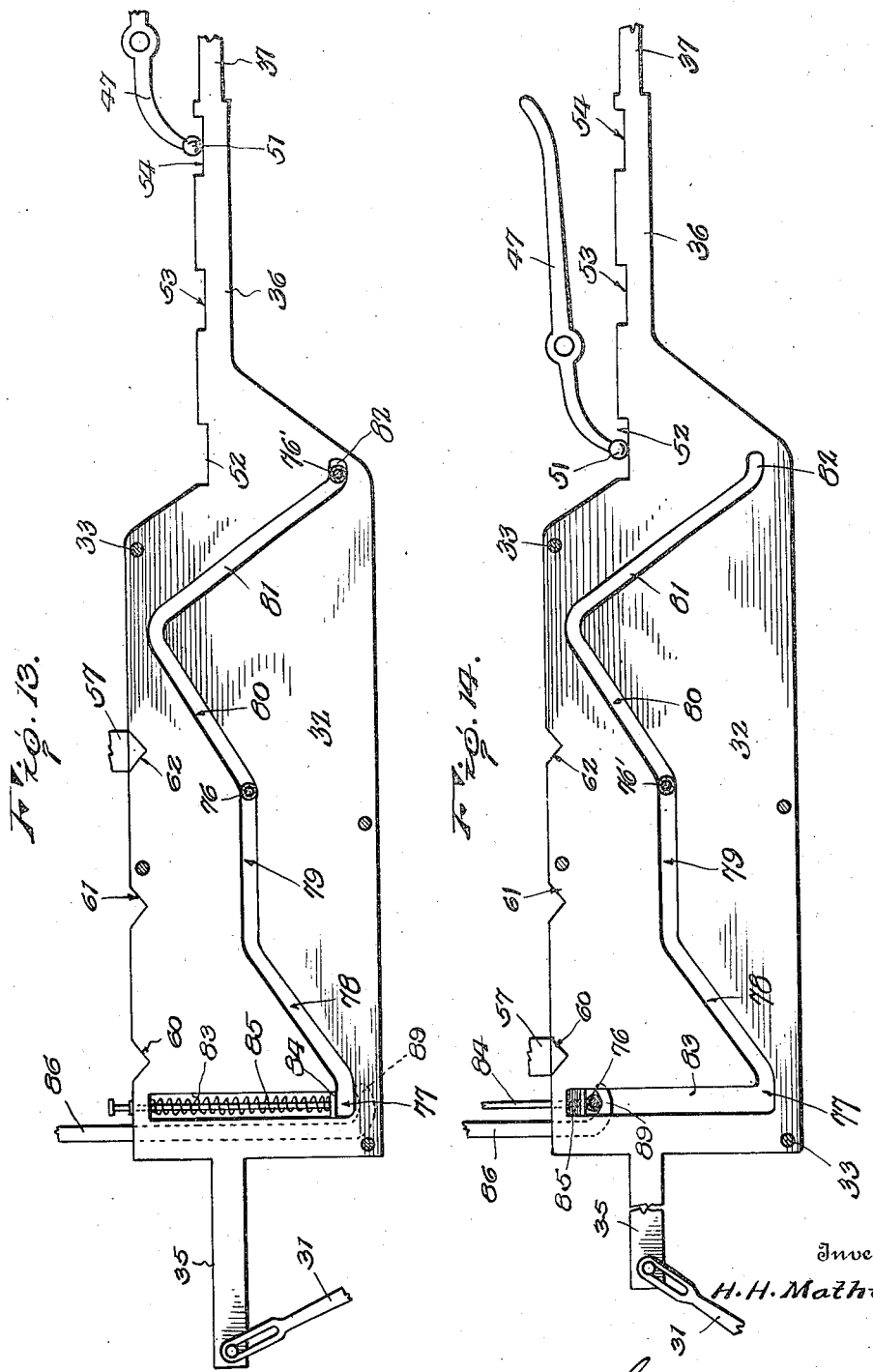

Patented Feb. 27, 1923.

1,446,806

UNITED STATES PATENT OFFICE.

HENRY H. MATHIS, OF NEW HAVEN, CONNECTICUT.

MECHANICAL GEAR SHIFT.

Application filed October 14, 1920. Serial No. 416,789.

*To all whom it may concern:*

Be it known that I, HENRY H. MATHIS, a citizen of the United States, residing at New Haven, in the county of New Haven and State of Connecticut, have invented certain new and useful Improvements in Mechanical Gear Shifts, of which the following is a specification.

This invention relates to an improved mechanical gear shift and has as one of its principal objects to provide a mechanism wherein selection of the speed gears will be automatically governed by the speed of the vehicle and wherein the shifting from one speed to another will be controlled by the clutch pedal.

A further object of the invention is to provide a mechanism wherein, in order that a shift may be made from one speed to another, the clutch pedal must be first depressed for releasing the clutch and wherein, after said pedal has been so depressed, the shift will be automatically accomplished.

Another object of the invention is to provide a mechanism wherein the clutch pedal may be depressed for disengaging the clutch without releasing the shifting mechanism.

A further object is to provide a mechanism wherein the shifting of the gears will be positive and wherein the shifting of any one gear cannot occur until after a gear already active has been first moved to neutral position.

And the invention has as a still further object to provide a mechanism which may be readily employed in connection with the transmission gear set of substantially any conventional design of motor vehicle.

Other and incidental objects will appear hereinafter.

In the drawings:

Figure 1 is a vertical sectional view showing my improved mechanism in connection with a gear set and clutch of conventional design, Figure 2 is a fragmentary transverse section particularly showing the mounting of the actuating bar employed, Figure 3 is a detail elevation particularly showing the reverse gear of the gear set, Figure 4 is a detail elevation particularly showing the main drive gear of the gear set, Figure 5 is a detail perspective showing the bracket employed for supporting the actuating bar at its forward end, Figure 6 is a detail perspective showing the clutch pedal employed, Figure 7 is a detail view of the signal employed, Figure 8 is a detail elevation showing the mechanism employed for accomplishing a shift to either reverse or neutral, Figure 9 is an end elevation of one of the rock shafts employed showing the mounting of the shifting fork or arm upon said shaft, Figure 10 is a detail side elevation of the shaft shown in Figure 9, Figure 11 is a diagrammatic view showing the position of the actuating bar for low speed, Figure 12 is a view similar to Figure 11, showing the position of the actuating bar for second speed, Figure 13 is a view similar to Figure 11, showing the position of the actuating bar for high speed, and Figure 14 is a diagrammatic view showing the manner in which neutral or reverse may be obtained.

Referring now more particularly to the drawings, I have, for convenience, shown my improved mechanism in connection with an ordinary motor vehicle gear set and clutch. A general description of these parts is necessary in order that the operation of the shifting mechanism may be made entirely clear. The gear set includes the usual gear case 10 through the forward end of which is journaled a drive shaft 11. Through the rear end of the case is journaled the driven shaft 12 extending in alinement with the drive shaft and below these shafts is mounted a counter-shaft 13. Fixed to the inner end of the drive shaft is a drive gear 14 provided upon its rear face, as shown in detail in Figure 4, with a plurality of spaced lugs. This gear is constantly in mesh with the gear 15 fixed to the counter-shaft. This shaft also carries gears 16, 17 and 18, which are fixed thereto and in mesh with the gear 18 is a reverse gear 19. Splined upon the driven shaft 12 is a gear 20 movable into mesh with the gear 17 for giving low speed and into mesh with the gear 19 for reverse, the gear 20 being in neutral when disposed, as shown in Figure 1, between the gears 17 and 19. Upon the shaft 12 is splined another gear 21 movable into engagement with the gear 16 for giving second speed and into engagement with the gear 14 for giving high speed, the gear 21 being provided upon its forward face with a plurality of lugs to cooperate with the lugs upon the drive gear. The gear 21 is, of course, in neutral position when disposed, as shown in Figure 1, between the gears 14 and 16. Splined upon the forward end portion of the drive shaft 11 is the usual clutch cone 22 movable to cooperate with its drum 23 driven by the vehicle engine. Thus, as will be seen, by shifting the gears 20 and 21 backward and forward, low, second and high speeds may be selectively obtained, as well as neutral and reverse.

In carrying the invention into effect, I employ a governor which is mounted upon the driven shaft 12 and actuated thereby. This governor includes a collar 24 fixed to the shaft at the rear of the gear case 10 and splined upon the shaft is a second collar 25. Extending between these collars and pivotally connected thereto are weighted governor arms 26, and surrounding the shaft to bear between said collars is a spring 27 normally holding the collar 25 away from the collar 24. Surrounding the shaft and suitably secured to the gear case 10 is a governor case 28 and, as will be observed, the collar 25 is adapted to abut the rear end wall of this case to be limited thereby in its rearward movement under the influence of the spring 27. Journaled through one side wall of the case 28 is, as particularly shown in Figure 2, a rock shaft 29 provided at its inner end with a depending fork 30 coacting with the collar 25 and at its outer end with an upstanding arm 31. This arm is pivotally connected to the reciprocable actuating bar 32 employed. As particularly shown in Figure 2, the actuating bar is mounted at the left of the gear case and projecting laterally from the inner side of said bar are vertically spaced staggered brackets 33. Suitably fixed to the gear case to freely receive said brackets therethrough are guides 34 slidably supporting the bar, the guides being adapted to coact with the laterally turned ends of the brackets for limiting the bar in its forward and rear movement. Projecting from the rear end of the bar is a medially disposed arm 35 extending within a suitable yoke upon the upper end of the arm 31 and engaged through the arm and freely through suitable slots in the sides of the yoke is a pin pivotally connecting the arm with the yoke. Projecting forwardly from the front end of the bar is a reduced extension 36 and projecting forwardly from said extension is a rod 37 integral therewith. Secured to the forward end of the gear case 10 is, as shown in detail in Figure 5, a bracket 38 and mounted upon said bracket to freely receive the rod therethrough is a guide 39 slidably supporting the bar at its forward end portion. Thus, as will be seen, rotation of the shaft 12 will cause the governor to rock the shaft 29. As the speed of rotation of the driven shaft is increased the actuating bar will be moved rearwardly while, as the speed of rotation of the driven shaft is decreased, said bar will, due to the influence of the spring 27, be moved forwardly.

Projecting from the forward end of the gear case 10 is a bracket 40 and journaled upon this bracket is, as shown in detail in Figure 6, a clutch pedal 41 provided at its inner end with a depending fork 42 coacting with the clutch cone 22 and at its outer end with an upstanding arm 43 carrying the pedal 44. Upstanding from the shaft 41 is a second arm 45 provided at its upper end with a laterally and inwardly directed terminal or trip 46. This trip is arranged to cooperate with a latch 47. As best shown in Figure 2, a laterally projecting bracket 48 is secured to the gear case at its forward end portion and projecting laterally inward from the upwardly directed terminal of said bracket is a stub shaft 49 upon which the latch is pivoted. Secured at one end to said terminal and bearing at its opposite end over the rear end portion of the latch is a spring 50 and, as will now be noted, the latch is formed at its inner end with a laterally directed arm 51 normally held by the spring to ride against the actuating bar 32. Formed in the upper edge of the extension 36 of said bar are longitudinally spaced notches 52, 53 and 54 adapted to selectively receive the arm of the latch. However, it is to be particularly noted that each of said notches is of a length to permit a limited longitudinal movement of the bar independently of the latch. At its outer end portion the latch is longitudinally curved upwardly and formed upon the forward end of said latch is an upwardly directed oblique terminal or lug 55. As best shown in Figure 1, the clutch pedal may be depressed or shifted forwardly to a medial position without disengaging the latch. However, when the clutch pedal is shifted to an extreme forward position, the trip 46 will be brought into contact with the terminal 55 of the latch for rocking the forward end of the latch downwardly and consequently releasing the actuating bar so that the bar may shift under the influence of the governor. Upon the return of the clutch pedal to its normal position, the latch will then be moved to engage the arm thereof in one of the notches 52, 53 and 54 for locking the bar. As will be seen, this construction provides an arrangement whereby the driver of the vehicle may, at any time desired, disengage the clutch without releasing the gear shifting mechanism.

Further, since the latch will normally lock the actuating bar against endwise movement, the automatic operation of said mechanism will be entirely under the control of the clutch pedal.

Suitably mounted above the actuating bar 32 is a detent casing 56 in which is mounted a detent 57 slidable through the bottom wall of said casing and provided with a suitable key to coact with said wall for holding the detent against rotation. Bearing against the detent within the casing is a spring 58 and threaded through the top wall of the casing is an adjusting screw 59 which may be positioned for tensioning the spring. Formed in the upper edge of the actuating bar 32 is a plurality of V-shaped notches 60, 61, and 62, spaced apart to conform to the spacing of the notches 52, 53, and 54 in the extension 36 of the bar. The lower end of the detent is beveled to selectively fit in these notches. Mounted upon the detent, but insulated therefrom, is a spring contact 63 and arranged at some convenient point upon the floor of the vehicle is, as particularly shown in Figure 7, a circuit breaker which includes a foot operated plunger contact 64 and a coacting fixed contact 65, the plunger normally being held in engagement with the fixed contact by a suitable spring bearing between the floor and the plunger head. A circuit wire is connected with the contact 63 and another circuit wire is connected to the detent casing 56. The circuit is normally closed by the circuit breaker and interposed in said circuit is a suitable signal 66. When the actuating bar 32 is in its extreme forward position, the detent 57 will engage in the notch 60 of the bar while the arm 51 of the latch will engage in the notch 52 lying medially thereof. Upon rearward movement of the bar, the detent will then engage in the notch 61 when the arm 51 of the latch will engage in the notch 53 lying medially thereof. Under continued rearward movement of the bar, the detent will then engage in the notch 62 while the arm 51 of the latch will engage in the notch 54 lying medially thereof. When the detent is thus engaged in any one of the notches 60, 61 and 62, the clearance between the arm 51 of the latch and the end walls of the notch seating said arm will be such that the bar may, independently of the latch, be shifted either forwardly or rearwardly to ride the detent out of its notch up onto the upper edge of the bar and it will now be assumed for convenience that the governor is set to thus shift the bar rearwardly when the vehicle reaches a speed of say five miles an hour. Accordingly, when this speed is attained the governor will operate to pull the bar rearwardly and ride the detent 57 out of the notch 60 of the bar. The contact 63 upon the detent will thus be moved to engage the detent casing 56 and close the circuit through the signal 66 so that the operator of the vehicle will be apprised of the fact that the vehicle has attained a speed whereby a change may be made from low to second gear. The positions which the slidable gears of the gear set are caused to assume in the different positions of the actuating bar, as well as the means whereby said gears are shifted, will be later explained. If it is not desired to change gears and the continued sounding of the signal 66 becomes annoying, the plunger 64 of the circuit breaker may be depressed for breaking the circuit through the signal. On the other hand, if it is desired to change gears, the foot pedal 44 may be moved forwardly to its extreme position for disengaging the clutch and releasing the latch 47 when the governor will then operate to pull the actuating bar rearwardly until the detent 57 drops into the notch 61. The detent will thus arrest the rearward movement of the bar so that upon release of the clutch pedal, the arm 51 of the latch will drop into the notch 53 for locking the bar. Upon a further increase in the speed of the vehicle the governor will then shift the bar rearwardly to ride the detent out of the notch 61 for again closing the circuit through the signal, indicating that the vehicle has attained a speed sufficient to permit automatic shifting from second speed to high speed. Consequently, when the foot pedal is then depressed for releasing the latch, the bar will be pulled rearwardly until the detent 57 drops into the notch 62. Accordingly, upon release of the foot pedal, the arm 51 of the latch will engage in the notch 54 for locking the bar. Beyond this point, the bar cannot be further moved rearwardly upon an increase in speed of the vehicle since the guides 34 will coact with the brackets 33 for limiting the bar. It will thus be seen that as the speed of the vehicle is increased and the continued action of the governor is brought to bear upon the actuating bar, the signal will apprise the operator as to when a shift may be made from low gear to second gear and from second gear to high gear. Upon a decrease in the speed of the vehicle, the spring 27 of the governor will, of course, cause the actuating bar to be moved forwardly and, as will be understood, the signal will be sounded when a shift may be made from high gear to second and from second gear back to low gear. The governor may, of course, be adjusted to effect a change in gears at any minimum speed desired.

Journaled through the adjacent side wall of the gear case 10 is a rock shaft 67 provided at its inner end, as particularly shown in Figure 2, with a depending fork 68 coacting with the gear 20, and at its outer end with a laterally directed arm 69. Journaled through said side wall of the gear case in front of the shaft 67 is a rock shaft 70 and formed upon the inner end of said shaft are, as shown in detail in Figures 9 and 10, depending diverging stop wings 71. Mounted to swing upon the inner end of the shaft between said wings is a depending fork 72 coacting with the gear 21 and extending through the wings and through said fork is a guide rod 73. Bearing between the wings and the opposite sides of the fork are springs 74 normally holding the fork centered with respect to the wings. At its outer end, the shaft 70 is, like the shaft 67, provided with a laterally directed arm 75 and mounted upon the arms of said shafts at the outer ends of said arms are rollers 76 and 76'. Formed in the actuating bar 32 to extend longitudinally thereof is, as best seen in Figures 11 to 14 inclusive, a cam slot snugly receiving said rollers therethrough. At the rear end of the bar, this slot is formed with a horizontal portion 77 from which rises forwardly an upwardly inclined portion 78. Extending from said inclined portion is a horizontal portion 79 and from this horizontal portion the slot is formed with a second upwardly inclined portion 80. Sloping from the inclined portion 80 is a downwardly inclined portion 81, at the lower end of which the slot is formed at its front end with a horizontal portion 82 lying substantially in a plane with the horizontal portion 77 of the slot. Rising from the slot at its rear end is a vertical slot 83 and slidable vertically upon the bar to project within this slot is, as particularly shown in Figure 8, a plunger 84 normally held projected by a spring 85 surrounding the plunger rod. Slidable through the floor boards of the vehicle to extend adjacent the rear end portion of the actuating bar is a manually operable control rod 86 carried by suitable brackets 87. This rod extends vertically upward immediately in front of the counter of the driver's seat of the vehicle and is provided at its upper end with a handle 88 which may be readily reached from said seat while upon the lower end of said rod is formed a laterally directed arm 89 extending along the outer side of the actuating bar close thereto in position for engagement beneath the roller 76 of the arm 69, this roller being, as particularly shown in Figure 2, somewhat longer than the roller 76' of the arm 75. Secured to the counter of the driver's seat is a latch plate 90 having vertically spaced notches 91, 92 and 93 respectively, and pivoted upon the control rod to selectively engage in said notches is a spring pressed latch 94.

As will now be noted upon particular reference to Figure 11 of the drawings, when the actuating bar 32 is in its extreme forward position, the roller 76 associated with the shaft 67 will normally be disposed in the portion 77 of the cam slot of said bar while the roller 76' associated with the shaft 70 will lie at the forward end of the portion 79 of said slot. In this position of the bar, the shaft 67 will be rocked rearwardly and the gear 20 engaged with the gear 17 of the gear set for giving low speed. On the other hand, the roller 76' will hold the shaft 70 in such position that, as shown in Figure 1, the gear 21 will be in neutral. When the roller 76 is thus disposed in the portion 77 of the cam slot, and the control rod 86 is, as shown in Figure 8, in its normal lowermost position, said roller will project over the arm 89 of the rod and assuming that it is desired to shift the gear 20 to neutral position so that both the gears 20 and 21 will be in neutral, the rod 86 is raised and the latch 94 thereof engaged in the notch 92 of the latch plate. The roller 76 will thus be raised upwardly within the slot 83 of the bar against the action of the spring pressed plunger 84 so that the shaft 67 will be rocked and the gear 20 shifted rearwardly to the position shown in Figure 1. Should reverse be desired, the control rod 86 is further raised until the latch 94 engages in the notch 93 of the latch plate when, as shown in Figure 14, the roller 76 will be disposed near the upper end of the slot 83. Elevation of this roller to its extreme position will cause the shaft 67 to be rocked until the gear 20 is moved into mesh with the gear 19 for giving reverse. Upon release of the latch 94, the spring pressed plunger 84 will, of course, immediately return the roller 76 to rest within the portion 77 of the cam slot so that the gear 20 will accordingly again be shifted into mesh with the low speed gear 17. As will thus be seen, the mechanism is manually operable for shifting from low speed to neutral or vice versa and from neutral to reverse or vice versa.

Assuming now that the gear 20 is in mesh with the low speed gear 17 so that the rollers 76 and 76' occupy the positions shown in Figure 11, it will be seen that when the vehicle has attained sufficient speed and the clutch pedal of the vehicle is depressed for disengaging the clutch and releasing the latch 47, the actuating bar will be pulled rearwardly until the detent 57 drops into the notch 61 of said bar. As shown in Figure 12, the roller 76 will then have ridden up the inclined portion 78 of the cam slot while the roller 76' will have ridden up the inclined portion 80 of said slot. As a result, the gear 20 will be shifted rearwardly to neutral position while the gear 21 will be moved rearwardly into engagement with the second speed gear 16 for giving second speed. Upon further increase in the speed of the vehicle and subsequent depression of the clutch pedal for releasing the latch 47, the actuating bar 32 will again be moved rearwardly until the detent 57 drops into the notch 62 of said bar. As shown in Figure 13, the roller 76 will then have ridden forwardly through the horizontal portion 79 of the cam slot while the roller 76' will have ridden down the inclined portion 81 of said slot into the horizontal portion 82 thereof. As a result, the gear 20 will remain stationary while the gear 21 will be shifted forwardly into engagement with the high speed gear 14 for giving high speed. Thus, as will be seen, shifting of the gears from low speed to second speed and from second speed to high speed may be automatically accomplished and, of course, upon a decrease in speed of the vehicle, the mechanism will operate in a manner reverse to that just described so that shifting of the gears from high speed to second speed and from second speed to low speed will also be automatically accomplished, the selection of the gear next to become active being controlled by the rate of speed of the vehicle. The detent 57 will, as will be clear, permit only a step by step movement of the actuating bar 32 so that when either of the gears 20 or 21 becomes active, the bar will be held against the action of the governor until the clutch pedal is released for releasing the latch 47 to lock the bar. Since the gear 21 may sometimes fail to immediately engage with the gear 14 or to mesh with the gear 16, provision is made for limited rocking movement of the shaft 70 independently of the fork 72 so that, under such circumstances, the shifting of the bar 32 may progress the full length of its step to be locked by the latch 47. Assuming the bar 32 to be moving rearwardly from the position shown in Figure 11 to the position shown in Figure 12, for shifting the gear 21 into engagement with the second speed gear 16, it will be seen that should the gears fail to mesh and thereby prevent swinging of the fork 72, that one of the springs 74 at the right of said fork, as seen in Figure 1, would be compressed under continued rotation of the shaft 70 until the detent 57 dropped into the notch 61 of the actuating bar. Said spring would then act against the fork for swinging the fork and consequently operate to urge the gear 21 into engagement with the gear 16 so that as soon as the teeth of this latter gear moved out of alinement with the teeth of the gear 21, the shifting movement of the gear 21 would be completed. Upon forward movement of the gear 21, that one of the springs 74 at the left of the fork 72 would operate in a similar manner to urge the gear 21 into engagement with the gear 14. Improper functioning of the mechanism by locking of the gear 21 with either of the gears 14 or 16 will accordingly be prevented.

While I have illustrated a preferred embodiment of the invention still, as will be appreciated in view of the preceding description, various minor changes or variations may be made in the exact arrangement shown, without departing from the spirit of the invention. For instance, the arms 69 and 75 instead of being connected each to one of a pair of rock shafts, as disclosed, may be coupled with the usual selector rods of a vehicle transmission and good results obtained. Further, the governor may be mounted, as a separate unit, at some point spaced from the driven shaft 12, to be driven thereby, and if found feasible, independent movement of the shaft 70 relative to the fork 74 may be eliminated. As will be perceived, the mechanism may be built into a gear set to form a part of the original structure thereof or may be supplied separately to be later attached to the mechanism. I accordingly reserve the right to all such modifications.

Having thus described the invention, what is claimed as new is:

1. Gear shifting mechanism including shifting means, actuating means for the first means, means for automatically shifting the second means, means for arresting the second means in its shifting movement, and means for locking the second means when arrested by the fourth means but permitting limited shifting of the second means to render the fourth means inactive.

2. Gear shifting mechanism including shifting means, actuating means for the first means, means for automatically shifting the second means, means for arresting the second means in its shifting movement whereby the second means will be shifted step by step, and means for locking the second means at each step while permitting limited movement of the second means rendering the fourth means inactive.

3. Gear shifting mechanism including shifting means, actuating means for the first means, means for automatically shifting the second means, means for arresting the second means in its shifting movement, a signal associated with the fourth means, and means for locking the second means when arrested by the fourth means but permitting limited shifting of the second means to render the fourth means inactive and operate said signal.

4. Gear shifting mechanism including shifting means, a reciprocable actuating bar operatively coacting with said means and shiftable for operating said means, means for automatically shifting the bar, the bar being provided with notches, a detent selectively engageable in said notches for arresting the bar in its shifting movement whereby the bar will be shifted step by step, a signal associated with the detent, and means for locking the bar at each step but permitting limited shifting of the bar to ride the detent out of any one of said notches and operate said signal.

5. Gear shifting mechanism including shifting means, a reciprocable actuating bar operatively coacting with said means and shiftable for operating said means, means for automatically shifting the bar, means for arresting the bar in its shifting movement whereby the bar will be shifted step by step, the bar being provided with notches, and a latch selectively engageable in said notches for locking the bar at each step.

6. Gear shifting mechanism including shifting means, a reciprocable actuating bar operatively coacting with said means and shiftable for operating said means, means for automatically shifting the bar, the bar being provided with notches, a detent selectively engageable in said notches for arresting the bar in its shifting movement whereby the bar will be shifted step by step, the bar being further provided with elongated notches, and a latch selectively engageable in the elongated notches of the bar for locking the bar at each step but permitting limited shifting of the bar to ride the detent out of any one of the first notches.

7. In gear shifting mechanism, the combination of oscillating shifting means, reciprocable actuating means slidably coacting with the first means, speed controlled means for automatically reciprocating the second means, and spring pressed means normally locking the second means.

8. In gear shifting mechanism, the combination of oscillating shifting means, reciprocable actuating means slidably coacting with the first means, speed actuated speed controlled means for automatically reciprocating the second means, and means for arresting the second means in its reciprocating movement.

9. In gear shifting mechanism, the combination of oscillating shifting means, reciprocable actuating means slidably coacting with the first means, speed actuated speed controlled means for automatically reciprocating the second means, and means for arresting the second means in its reciprocating movement whereby the second means will be reciprocated step by step.

10. In gear shifting mechanism, the combination of oscillating shifting means, reciprocable actuating means slidably coacting with the first means, speed actuated speed controlled means for automatically reciprocating the second means, means for arresting the second means in its reciprocating movement whereby the second means will be reciprocated step by step, and means for locking the second means at each step.

11. In gear shifting mechanism, the combination of oscillating shifting means, reciprocable actuating means slidably coacting with the first means, means for automatically reciprocating the second means, means for arresting the second means in its reciprocating movement whereby the second means will be reciprocated step by step, means for locking the second means at each step, and foot operated means for releasing the locking means.

12. In gear shifting mechanism, the combination of oscillating shifting means, a reciprocable actuating bar slidably coacting with said means, speed actuated speed controlled means for automatically reciprocating the bar, means for arresting the bar in its reciprocating movement whereby the bar will be reciprocated step by step, and means for locking the bar at each step.

13. In gear shifting mechanism, the combination of oscillating shifting means, a reciprocable actuating bar slidably coacting with said means, means for automatically reciprocating the bar, the bar being provided with notches, a detent selectively engageable in said notches for arresting the bar in its reciprocating movement whereby the bar will be shifted step by step, and means for locking the bar at each step.

14. In gear shifting mechanism, the combination of oscillating shifting means, reciprocable actuating means slidably coacting with the first means, means for automatically reciprocating the second means, means for arresting the second means in its reciprocating movement whereby the second means will be reciprocated step by step, a latch for locking the second means at each step, and a clutch pedal movable to one position for releasing a clutch and to a further position for releasing said latch.

15. Gear shifting mechanism including in combination with a pair of slidable gears, rock shafts having forks at corresponding ends thereof coacting with the gears and provided at their opposite corresponding ends with arms, reciprocable actuating means slidably coacting with said arms for swinging the arms whereby to shift the gears, and means for manually swinging one of the arms individually for shifting one of the gears.

16. Gear shifting mechanism including in combination with a pair of slidable gears, rock shafts having forks at corresponding ends thereof coacting with the gears and provided at their opposite corresponding ends with crank arms, reciprocable actuating means slidably coacting with said arms for swinging the arms whereby to shift the gears, and a manually reciprocable control rod engageable with one of said arms individually for shifting one of the gears.

17. Gear shifting mechanism including in combination with a pair of slidable gears, companion oscillating shifting means coacting with said gears, reciprocable actuating means slidably coacting with the first means for automatically oscillating the first means, and means associated with one of the first means whereby such of the first means may accommodate delayed movement of the gear associated therewith when the second means is reciprocated.

18. Gear shifting mechanism including in combination with a pair of slidable gears, rock shafts having forks coacting with the gears and provided with crank arms, reciprocable actuating means slidably coacting with said arms for automatically rocking the shafts whereby to shift the gears, the fork of one of the shafts being free thereon, arms projecting from said shaft at opposite sides of said fork, and springs bearing between the arms and the fork and normally holding the fork centered with respect to the arms but adapted to accommodate movement of the shaft independently of the fork when said means is reciprocated.

In testimony whereof I affix my signature.

HENRY H. MATHIS. [L. S.]